US005694675A

United States Patent [19]

Pasternak et al.

[11] Patent Number: 5,694,675

[45] Date of Patent: Dec. 9, 1997

[54] METHOD OF CENTERING A VEHICLE LATCH STRIKER

[75] Inventors: Larry Pasternak, Troy; Francis C. Whittle, Utica; Thomas N. Seel, Clarkston, all of Mich.

[73] Assignee: Chrysler Corporation, Auburn Hills, Mich.

[21] Appl. No.: 626,444

[22] Filed: Apr. 2, 1996

[51] Int. Cl.$^6$ ........................ B23Q 3/00; B25B 27/14

[52] U.S. Cl. ........................ 29/468; 29/271

[58] Field of Search ........................ 29/464, 468, 525.11, 29/271

[56] References Cited

U.S. PATENT DOCUMENTS 4,186,476 2/1980 Mair et al. ........................ 29/464
4,744,135 5/1988 Roels ........................ 29/271
5,282,305 2/1994 Nutt et al. ........................ 29/468

*Primary Examiner*—David P. Bryant
*Attorney, Agent, or Firm*—Lawrence J. Shurupoff

[57] ABSTRACT

A method of locating a striker on a vehicle body in position for engagement with a latch on a closure mounted on the vehicle body for swinging movement from an open position to a closed and latched position employs a device comprising a central frame, and a pair of elongated, rigid support bars. The inner ends of the bars are pivoted to the frame for swinging movement between a retracted position and an operative position in which the bars extend in opposite directions laterally outwardly from the frame in substantial alignment with one another. A spring mounted foot on the outer end of each bar is adapted to support the device on the vehicle body when the bars are in their operative positions. A striker locator is attached to the frame.

8 Claims, 5 Drawing Sheets

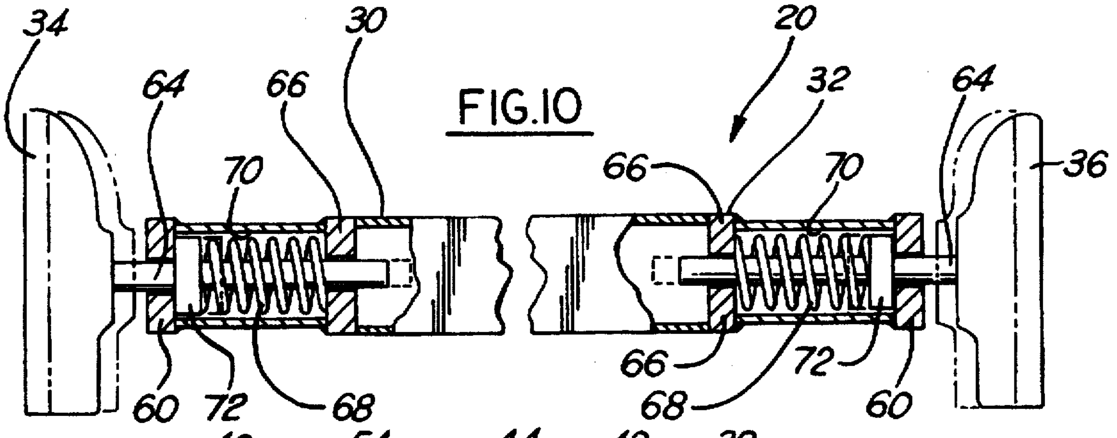
FIG.10
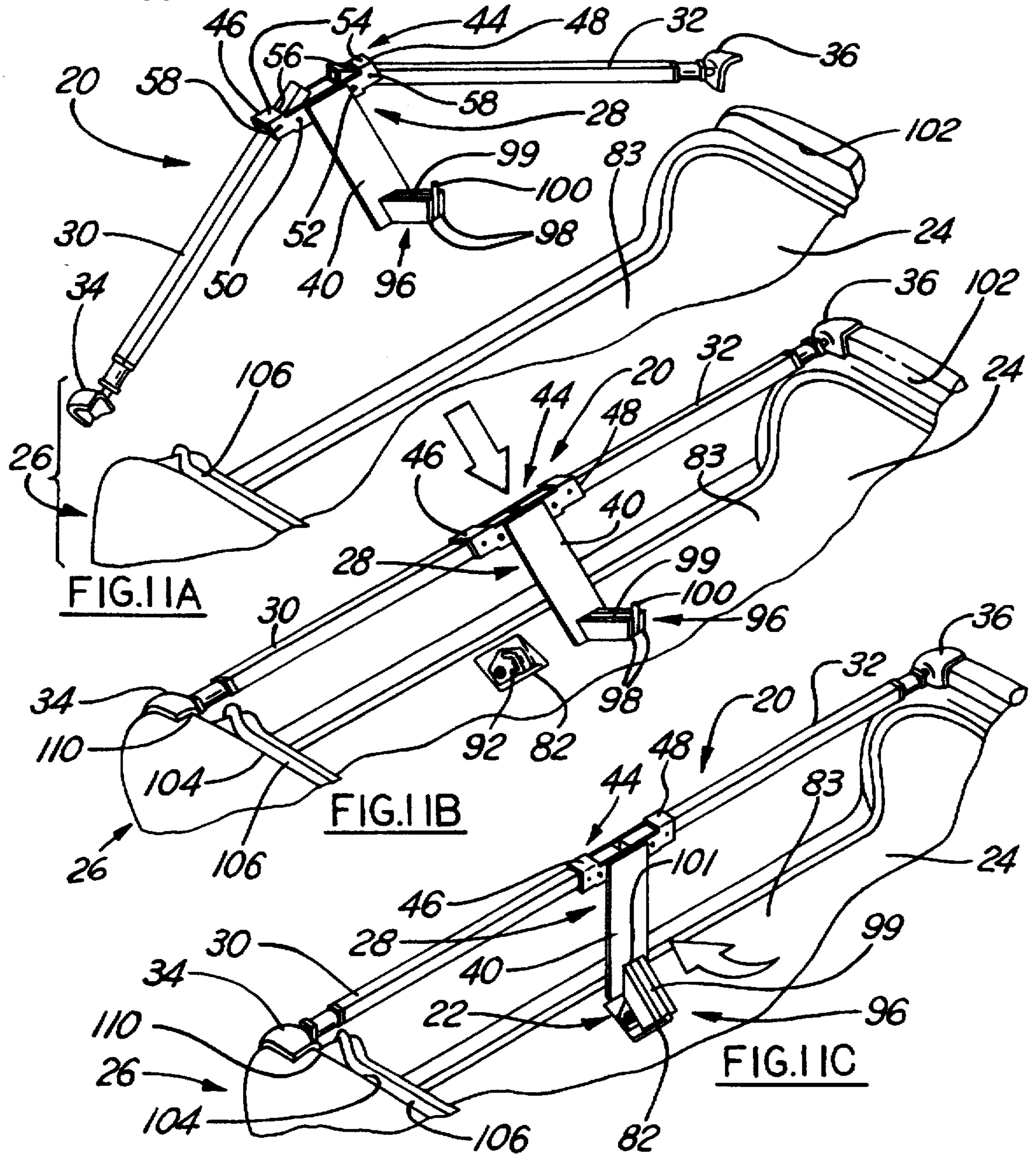
FIG.11A
FIG.11B
FIG.11C

METHOD OF CENTERING A VEHICLE LATCH STRIKER

FIELD OF INVENTION

This invention relates generally to a method of locating a latch striker on a vehicle, and more particularly a method of centering a striker in a vehicle body compartment for engagement with a latch on a closure mounted to open and close the compartment.

BACKGROUND AND SUMMARY

The various components and panels of a motor vehicle are made to very close tolerances. Nevertheless, because of an accumulation of tolerances and for other reasons, the relative location of these parts will vary slightly from vehicle to vehicle. This can be a problem where a swinging closure on a vehicle has to be latched in the closed position, because the latch striker must be in the right place in order for proper latching to take place.

In accordance with the present invention, a method is provided for locating a striker on the vehicle body in position to engage properly with a latch on the closure. More specifically, the striker is centered in a vehicle body compartment, such as the trunk or storage compartment, in position to be engaged by a latch on the deck lid.

Preferably, the method employs a device comprising a central frame and a pair of elongated, rigid support bars pivoted to the frame. The support bars are capable of swinging to an operative position in which they extend in opposite directions laterally outwardly from the frame in substantial alignment with one another. A foot on the outer end of each support bar supports the device on the vehicle body when the bars are in their operative positions. Preferably, the feet are spring loaded.

One object of this invention is to provide a method of locating a latch striker on a vehicle body having the foregoing features.

Another object is to provide a method which is capable of being easily and quickly carried out.

These and other objects, features and advantages of the invention will become more apparent as the following description proceeds, especially when considered with the accompanying drawings.

BRIEF DESCRIPTION OF THE DRAWINGS

FIG. 10 is a view partly in section and partly in elevation, with parts broken away, showing the spring mounting of the feet on the ends of the support bars of the device.

FIG. 11A is a perspective view of the rear of a vehicle showing the support bars of the device in the inoperative position, just prior to being mounted thereon across the storage compartment.

FIG. 11B is a perspective view showing the device mounted on the vehicle body across the storage compartment prior to rotating the striker locator of the device into engagement with the striker.

FIG. 11C is similar to FIG. 11B but shows the device rotated to a position in which the striker locator engages the striker.

DETAILED DESCRIPTION OF THE PREFERRED EMBODIMENT

The device 20 is used in the practice of the method of centering the striker 22 in the trunk or rear storage compartment 24 of a motor vehicle 26.

Figure 7:
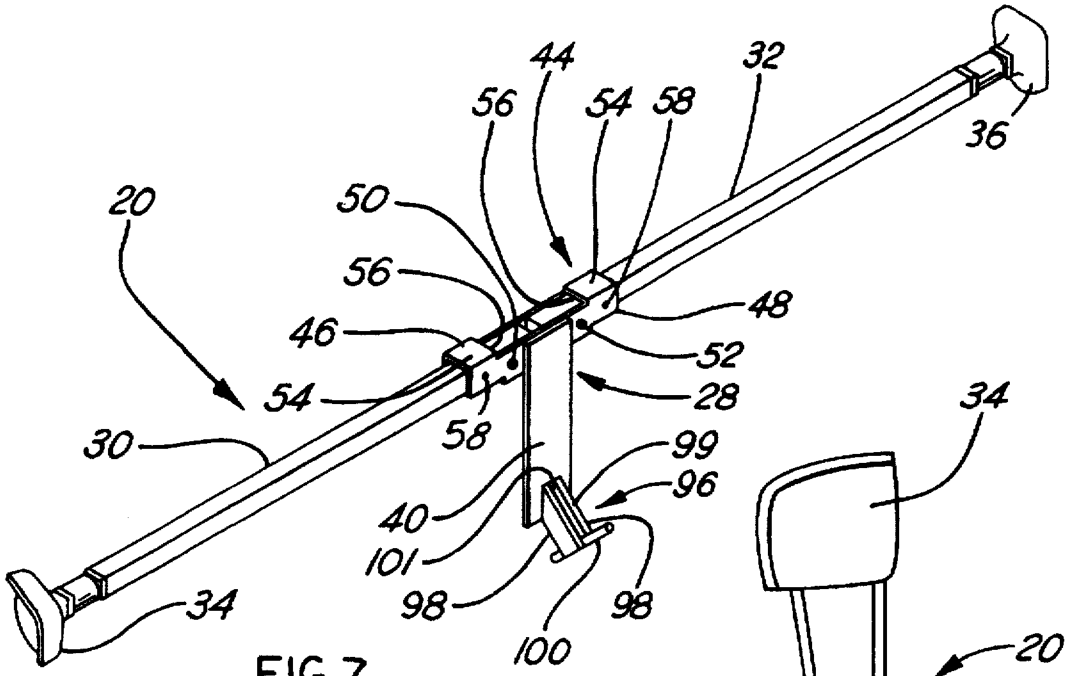
FIG. 7 is a perspective view of a device used in the practice of this invention, shown in its operative position.
Figure 9:
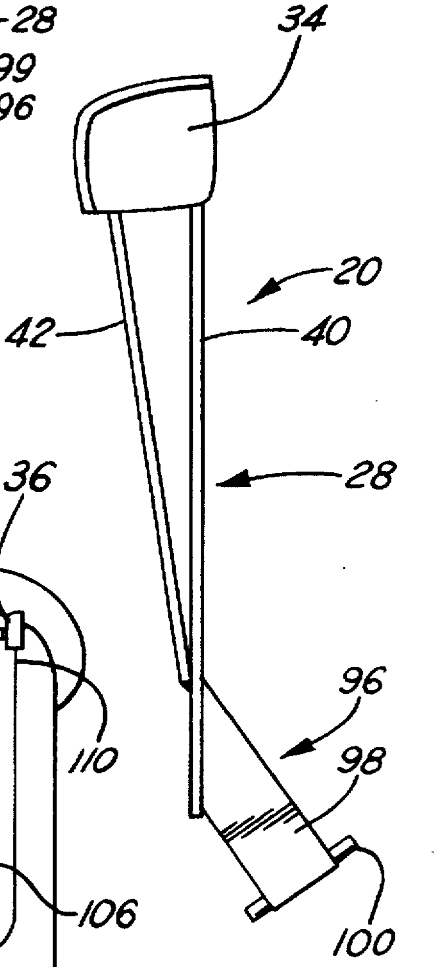
FIG. 9 is an end view of the device.
Figure 8:
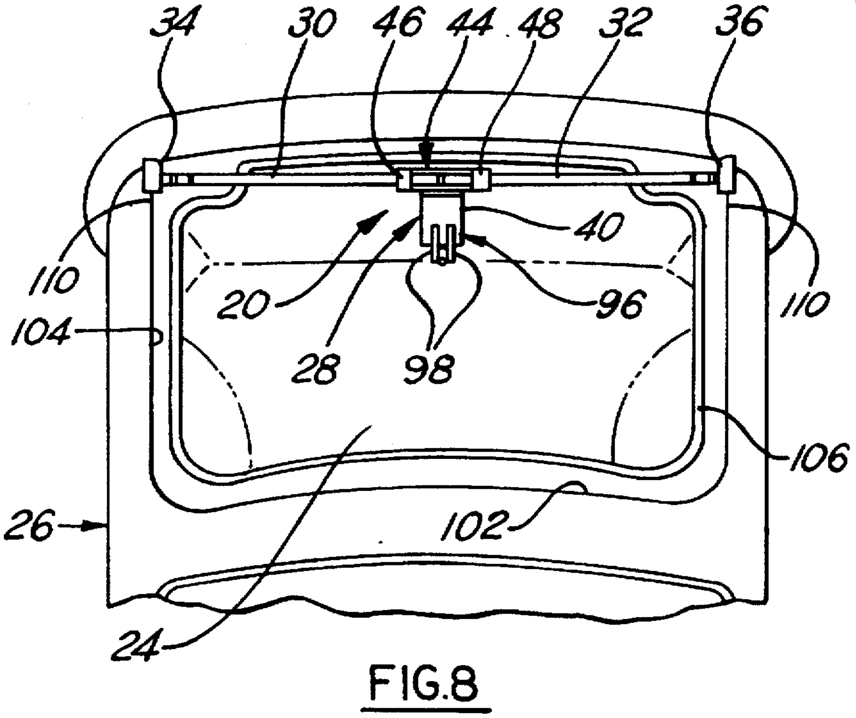
FIG. 8 is a view of the rear of the vehicle taken from above and with the deck lid removed, showing the device extending across the storage compartment opening in position to locate the latch striker.

The device 20 is best shown in FIGS. 7, 10 and 11A–11C and comprises a rigid, central frame 28, a pair of rigid elongated support bars 30 and 32, and feet 34 and 36 on the outer ends of the bars. The feet are preferably formed of a material which will not damage or mar the vehicle when engaged therewith, such as hard rubber or a suitable plastic.

The central frame 28 comprises an elongated, flat, rectangular support plate 40 and a reinforcing plate 42 welded or otherwise permanently secured to the plate 40.

A bracket 44 extends across one end of the plate 40 and is rigidly secured thereto as by welding. The bracket 44 has aligned laterally outwardly extending channels 46 and 48 on opposite sides of the plate 40. Pivot pins 50 and 52 extend across the respective channels. The pivot pins are spaced equal distances from the longitudinal centerline of the plate 40 and from the opposite side edges of the plate. The pivot pins are parallel to one another and perpendicular to the plane of the plate 40.

Figure 1:
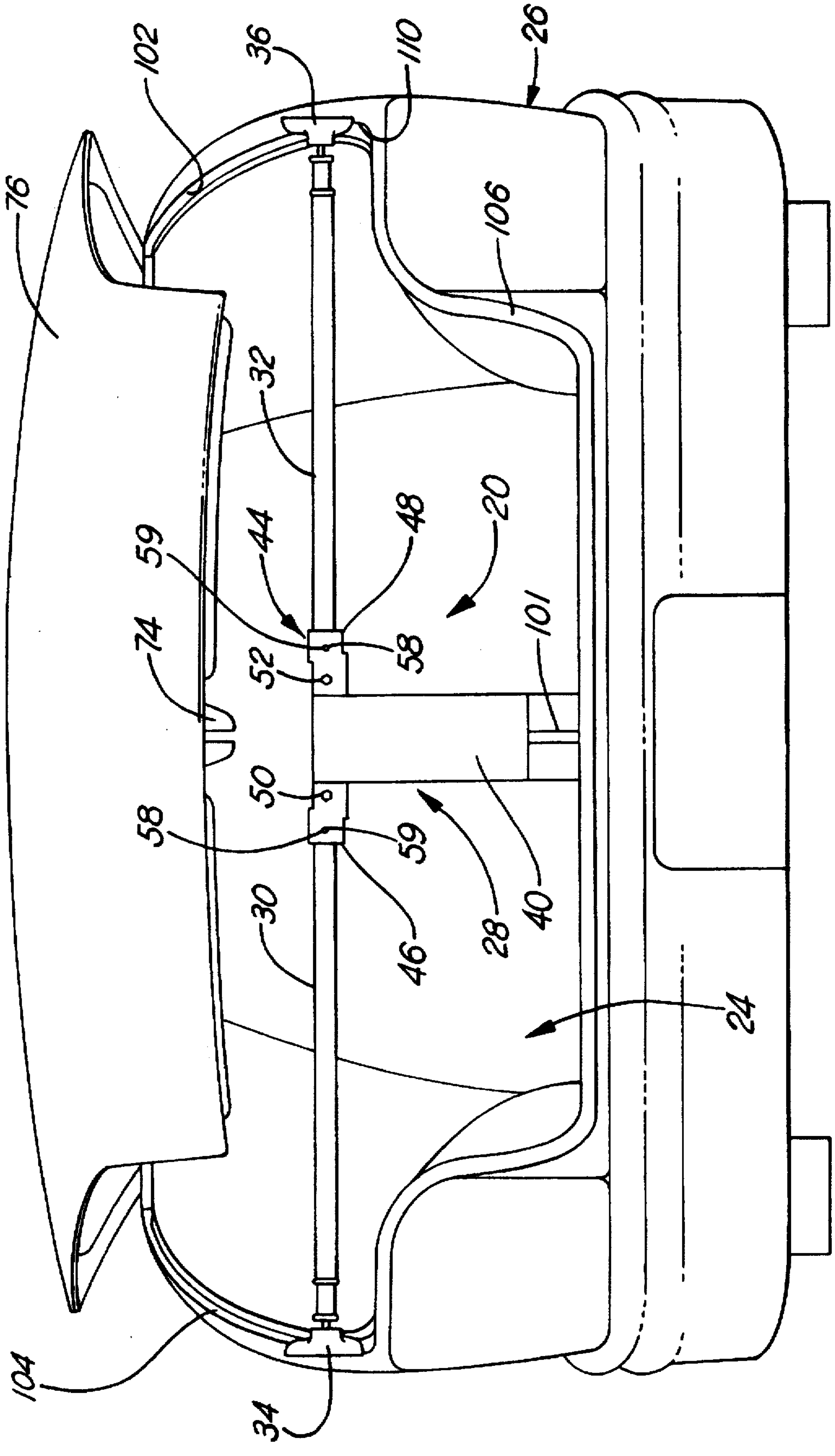
FIG. 1 is a rear view of a vehicle showing the deck lid partially open and a device employed in the practice of the method of this invention mounted across the rear storage compartment in position to locate and center a latch striker in the storage compartment.
Figure 2:
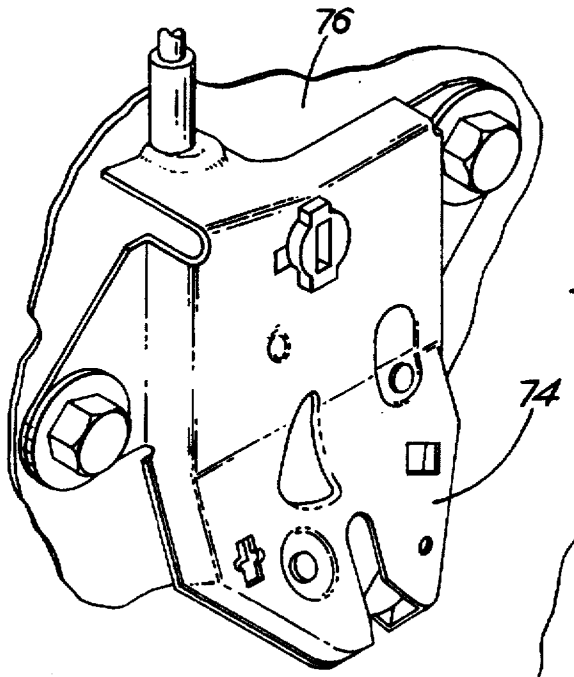
FIG. 2 is a fragmentary perspective view of the deck lid latch.

The inner end of bar 30 is mounted in channel 46 on pivot pin 50 and the inner end of bar 32 is mounted in channel 48 on pivot pin 52. The bars 30 and 32 are swingable on pivot pins 50 and 52 in a common plane which is parallel to the plate 40 from an inclined or retracted position shown in FIG. 11A to an operative position in which the bars extend in opposite directions laterally outwardly in substantial alignment with each other as shown in FIGS. 1, 7, 11B and 11C. The bases 54 of the channels 46 and 48 serve as abutments or stops to locate the swingable bars in their aligned, operative positions, and the inner edges 56 of the bases 54 serve as abutments or stops to locate the bars in the inclined or retracted positions thereof. The sides of each channel 46,48 have aligned holes 58 and the inner ends of bars 30 and 32 have holes which register with holes 58 when the bars are in their operative positions. Removable pins 59 may be inserted in the channel holes 58 and registering holes in the bars to retain the bars in their operative positions.

The bars 30 and 32 are tubular and equal in length. Referring to FIG. 10, each foot 34,36 has a rod 64 extending centrally therefrom which slides through a hole in the cap 60 on the end of the associated bar and also through a hole in an internal abutment 66 spaced from the cap. A coil spring 68 in the chamber 70 between the cap 60 and the abutment 66 of each bar is compressed between the abutment 66 and a ring 72 secured on the rod 64, to press the ring 72 against the abutment 66 and establish the limit of outward movement of each rod and foot. The springs 68 are of equal strength. In their outer limiting positions, the feet 34,36 are spaced equal distances from the longitudinal centerline of the frame 28. The feet may be pressed inwardly against the action of the springs 68 to the broken line positions shown in FIG. 10. The feet 34,36 and the rods 64 are capable of rotating relative to the bars 30,32. Accordingly, when the bars 30,32 are in the aligned, operative position and the feet are anchored, as they are when the device is used as later described herein, the bars and the central frame 28 can be rotated as shown in FIGS. 11B and 11C about an axis defined by the bars.

As above stated, the device 20 is designed to locate the striker 22 in a correctly centered position in the trunk or rear storage compartment 24 of the motor vehicle 26. The striker 22 is intended to be engaged by the latch 74 carried by the swinging edge of the deck lid 76 which is hinged to the vehicle body for swinging movement to and from a closed position with respect to the storage compartment. The latch 74 is centered on the swinging edge of the deck lid and it is therefore of the utmost importance that the striker 22 be properly positioned so that it will engage the latch when the deck lid is closed.

Figure 3:
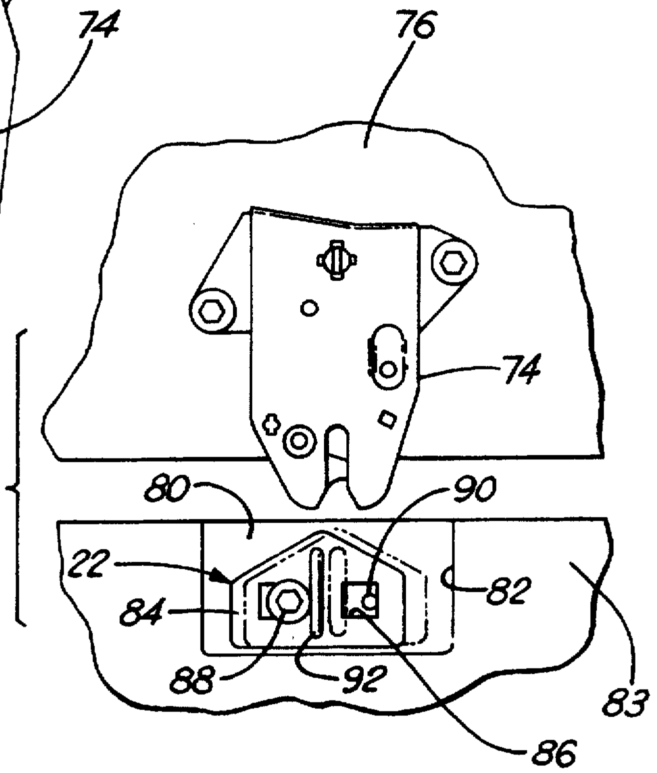
FIG. 3 is a view showing the deck lid partially closed and the latch approaching the striker which is shown in two different positions to illustrate the range of adjustment available for proper alignment with the latch.
Figure 4:
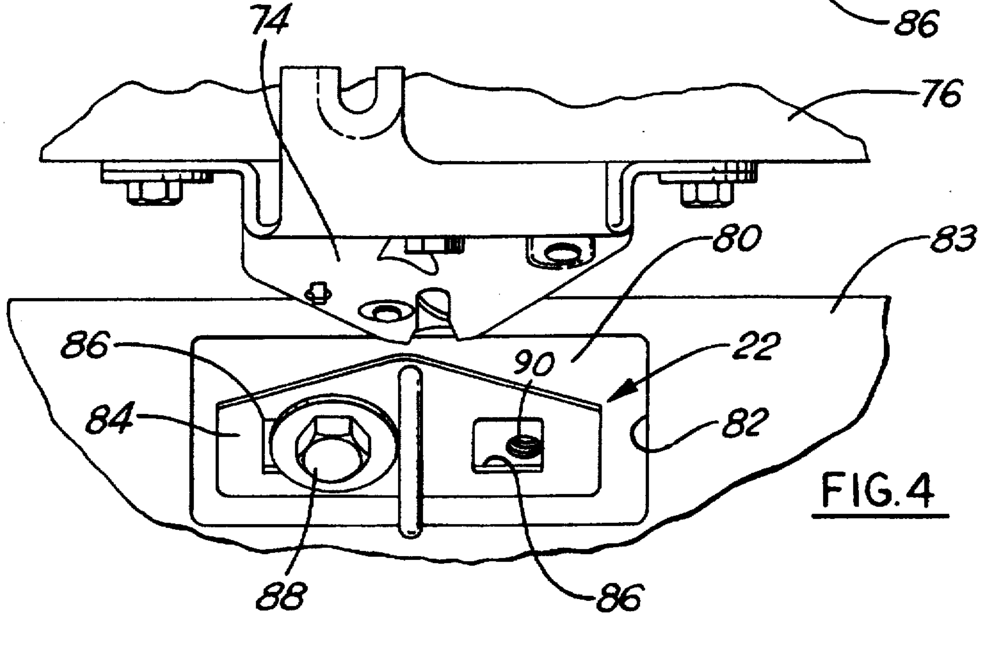
FIG. 4 is a view similar to FIG. 3, but taken from a different angle.
Figure 5:
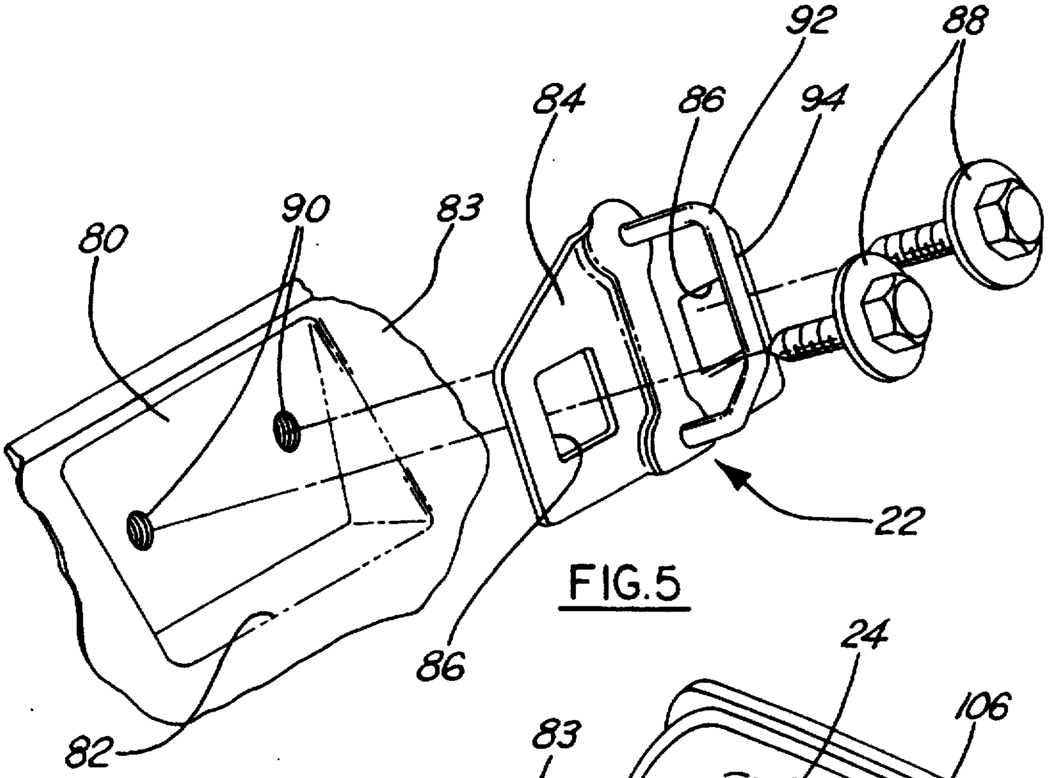
FIG. 5 is an exploded view in perspective showing the striker and illustrating the method of mounting the striker in the storage compartment.
Figure 6:
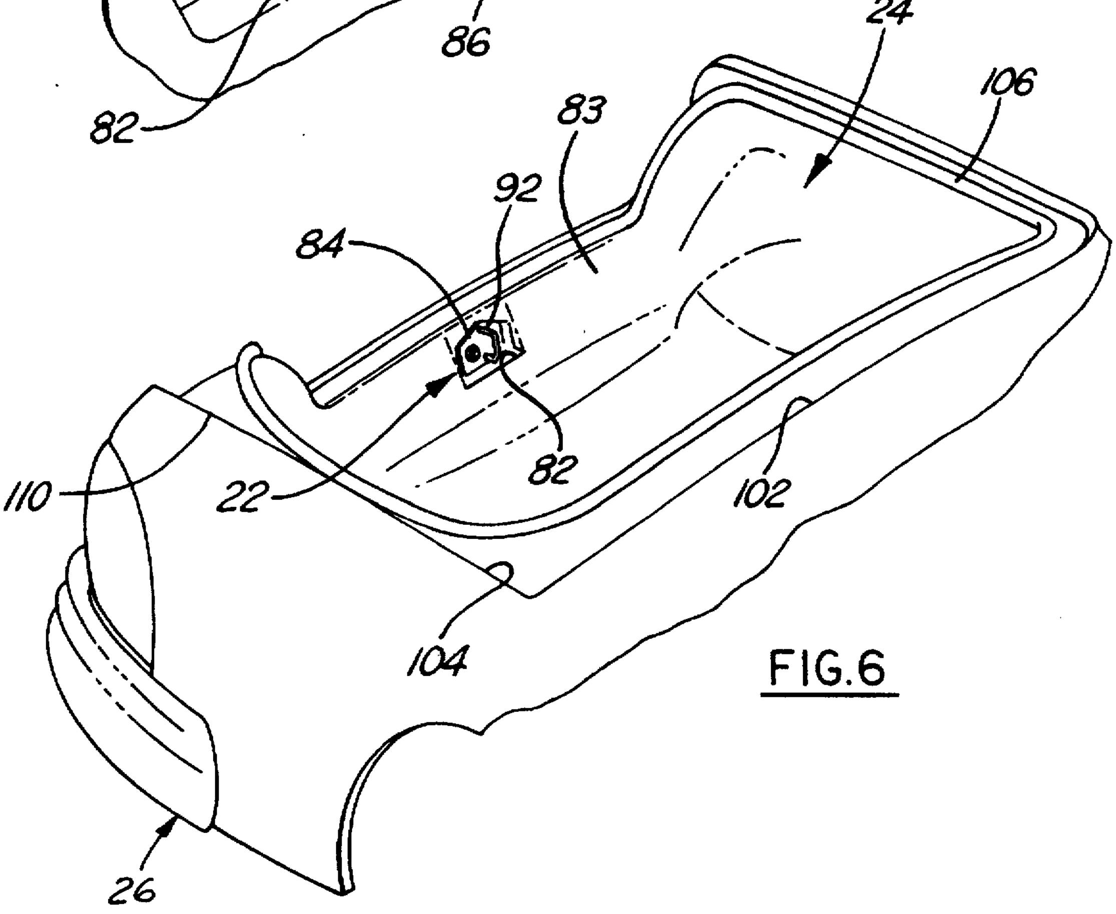
FIG. 6 is a perspective view of the rear of a vehicle with the deck lid removed for clarity, and showing the striker in position within the storage compartment.

The striker 22 is mounted on a wall 80 in a central recess 82 formed in a rear wall 83 of the storage compartment as shown in FIGS. 3–6. The striker 22 comprises a mounting plate 84 having a pair of enlarged apertures 86 for the reception of suitable fasteners such as bolts or screws 88 adapted to be threaded into registering threaded sockets 90 in the wall 80 of the recess. The apertures 86 are enlarged to permit lateral and vertical adjustment in the mounting of the striker 22. The striker also includes a striker bar 92 which is generally U-shaped and disposed in a vertical plane and disposed in a vertical plane and has its end portions secured to the mounting plate 84 so that the mid-portion 94 of the striker bar 92 is spaced forwardly from the mounting plate where it can be engaged by the latch 74 on deck lid 76. When the striker 22 is properly mounted in the recess 82, the striker bar 92 is disposed in a vertical plane on the longitudinal centerline of the vehicle.

A striker locator 96 is provided on the end of the plate 40 of the central frame 28 of device 20 opposite the end on which the bracket 44 is mounted. The striker locator 96 comprises a pair of parallel, closely laterally spaced apart plates 98 extending outwardly from the plate 40. The distance between the plates 98 is the same as or only slightly greater than the thickness of the mid-portion 94 of the striker bar 92. The slot 99 between plates 98 is located mid-way between the feet 34,36 of the device when the bars 30,32 are in their operative positions and occupies a plane perpendicular to the bars. A pin 100 between the plates 98 closes the outer end of the slot 99. A slot 101 in plate 40 registers with slot 99.

The opening 102 to the storage compartment 24 has an annular marginal edge 104 and an annular sealing element 106 inside the marginal edge.

The feet 34,36 are preferably configured to match the shape of the opposed side portions 110 of the marginal edge 104 around the opening to the compartment 24, at or near a corner thereof. The location of the recess 82 in which the striker 22 is mounted is centered with respect to the side portions 110 of the marginal edge 104.

In practicing the method of this invention, the striker 22 is loosely placed in the recess 82 with the mounting plate 84 pressed against the rear wall 80. The device 20 is mounted horizontally across the opening 102 to the storage compartment with the feet engaged with the side portions 110 of the marginal edge 104. The side portions 110 serve as abutments for the feet. The bars 30 and 32 may initially extend at an angle, but can be pivoted to their aligned, operative positions shown in FIGS. 1, 11B and 11C, by hand pressure against central frame 28. Pins 59 may be inserted to lock the bars in the operative position. The overall length of the device, when in the operative position, is preferably somewhat greater than the distance between the side portions 110 of the marginal edge 104 of the storage compartment opening 102 to which the feet of the device are engaged, so that when the device is mounted across the opening 102 the springs 68 mounting the feet are only slightly but equally compressed. Since the springs are of equal force, the center of the device 20 is centered on the opening 102 to the storage compartment.

The central frame 28 and bars 30,32 may be manually rotated about the stationary feet 34,36 to cause the central frame 28 to pivot from the position of FIG. 11B to the position of FIG. 11C in which slot 99 of the striker locator 96 receives the mid-portion 94 of the striker bar 92. This may require some lateral manipulation of the striker to enable the striker bar 92 to enter the slot 99. The slot 101 in plate 40 provides additional clearance for maneuvering the striker bar 92 into slot 99. The striker is also shifted lengthwise of the slot 99 to move the striker bar 92 into contact with the pin 100 of the locator 96 to locate the striker vertically. The fasteners 88 are then installed and tightened and the device 20 removed.

Rather than installing the fasteners 88 after centering the striker by use of the device 20, the fasteners may be loosely installed before the striker is centered and then tightened after centering.

What is claimed is:

1. A method of locating a striker in a vehicle body compartment in a mounted position for engagement with a latch on a closure hinged on the vehicle body for swinging movement from an operative position to a closed and latched position wherein the body has abutments on opposite sides of the compartment spaced substantially equal distances from the mounted position of the striker, said method comprising:

providing a device having a pair of elongated, rigid support bars pivoted to a central frame having a striker locator wherein the bars have outer ends remote from the central frame provided with vehicle abutment-engaging feet which are rotatable relative to the bars, qplacing the striker on the vehicle body in approximately the mounted position, applying the device to the vehicle body in a position extending across the compartment and with the feet engaging the abutments and the central frame positioned adjacent to the mounted position, applying downward pressure to the central frame causing the bars to pivot into aligned position, rotating the bars and central frame of the device relative to the feet to cause the striker locator to swing toward the mounted position and accurately locate the striker at the mounted position, and affixing the striker in the mounted position.

2. A method according to claim 1, wherein each said foot is mounted on the outer end of the associated bar by a spring urging the foot longitudinally outwardly to an outer limiting position, but compressible to permit longitudinally inward movement of the foot.

3. A method according to claim 2, wherein said device has means for locating the bars in the aligned position thereof, said bars are of equal length and the feet are spaced equal distances from the central frame when the bars are aligned and the feet are at the outer limiting positions thereof.

4. A method according to claim 3, wherein said striker locator is in the form of a slot adapted to receive the striker.

5. A method according to claim 1, wherein said striker locator is in the form of a slot adapted to receive the striker.

6. A method according to claim 1, wherein the device has means for locating the bars in the aligned position thereof.

7. A method according to claim 1, wherein said bars are of equal length.

8. A method according to claim 1, wherein the feet are spaced equal distances from the central frame when the bars are aligned and the feet are at the outer limiting positions thereof.

* * * * *